United States Patent
Chauvel et al.

(10) Patent No.: US 7,543,014 B2
(45) Date of Patent: Jun. 2, 2009

(54) SATURATED ARITHMETIC IN A PROCESSING UNIT

(75) Inventors: Gerard Chauvel, Antibes (FR); Dominique D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 690 days.

(21) Appl. No.: 10/631,196

(22) Filed: Jul. 31, 2003

(65) Prior Publication Data

US 2005/0027774 A1 Feb. 3, 2005

(30) Foreign Application Priority Data

Jul. 30, 2003 (EP) ................................. 03291929

(51) Int. Cl.
*G06F 7/38* (2006.01)
(52) U.S. Cl. ..................................... 708/552
(58) Field of Classification Search .................. 708/552
See application file for complete search history.

(56) References Cited

U.S. PATENT DOCUMENTS

| | | | | |
|---|---|---|---|---|
| 4,817,047 | A | * | 3/1989 | Nishitani et al. ............. 708/552 |
| 5,508,951 | A | * | 4/1996 | Ishikawa ..................... 708/552 |
| 5,847,978 | A | * | 12/1998 | Ogura et al. ................. 708/552 |
| 5,889,689 | A | * | 3/1999 | Alidina et al. ............... 708/552 |
| 5,907,498 | A | | 5/1999 | Rim |
| 6,098,089 | A | | 8/2000 | O'Connor et al. ............ 709/104 |
| 6,282,558 | B1 | | 8/2001 | Kabuo |
| 6,535,900 | B1 | * | 3/2003 | Perets et al. ................. 708/552 |
| 6,567,905 | B2 | | 5/2003 | Otis ............................ 711/170 |
| 6,571,260 | B1 | | 5/2003 | Morris ........................ 707/206 |
| 2002/0065990 | A1 | | 5/2002 | Chauvel et al. ............. 711/137 |
| 2002/0069332 | A1 | | 6/2002 | Chauvel et al. ............. 711/144 |
| 2003/0101320 | A1 | | 5/2003 | Chauvel et al. ............. 711/154 |

FOREIGN PATENT DOCUMENTS

| | | |
|---|---|---|
| EP | 0 345 819 A2 | 12/1989 |
| EP | 0 657 804 A1 | 6/1995 |
| EP | 0 686 910 A1 | 12/1995 |

OTHER PUBLICATIONS

*Embedded JAVA*, Vincent Perrier, Aug. 15, 2001, (3 p.); Online http://www.onjava.com/pub/a/onjava/synd/2001/08/15/embedded.html.
"DSP56301" Motorola User's Manual, 24-Bit Digital Signal Processor, Revision 3, Mar. 2001, XP-002268996, pp. 4,6-4-8.

* cited by examiner

*Primary Examiner*—Tan V Mai
(74) *Attorney, Agent, or Firm*—Dawn V. Stephens; Wade James Brady, III; Frederick J. Telecky, Jr.

(57) ABSTRACT

In some embodiments a system comprises an overflow control bit, a programmable saturation control bit, a processing unit, and a saturation unit coupled to the processing unit. A selection unit may select the output of the processing unit or the output of the saturation unit based on the state of the saturation control bit. Further, the saturation control unit may output a saturated or unsaturated value based on the overflow control bit.

17 Claims, 1 Drawing Sheet

SATURATED ARITHMETIC IN A PROCESSING UNIT

BACKGROUND OF THE INVENTION

1. Technical Field of the Invention

The present invention relates generally to performing saturated arithmetic in a processing unit.

2. Background Information

Saturated arithmetic operations are of increasing importance to numerous types of processing applications such as fixed-point algorithms used for media and signal processing applications. Typically, these applications are computationally intensive, executing millions of saturated operations in a second. Unlike a standard arithmetic operation, saturated arithmetic operations are designed to effectively handle instances in which computations overflow or underflow the data type (e.g., 4-bit twos complement) of the operation. For exemplary purposes, consider the unsigned 4-bit binary addition computation below. The computation on the left is performed with an unsaturated addition operation, and the computation on the right is performed with a saturated addition operation:

| Unsaturated Example | Saturated Example |
|---|---|
| 1101 | 1101 |
| + 1110 | + 1110 |
| (1) 1011 (Overflow) | 1111 |

The result of the unsaturated operation produces an overflow (i.e., the correct answer cannot fit into a four bit unsigned data structure). However, the saturated operation produces the highest possible value of a four bit unsigned data structure (i.e., 1111). Instead of producing an overflow, a saturated operation "saturates" the result to a maximum (or minimum) possible value. More specifically, when the computation produces a result larger than the maximum value, the maximum value becomes the result of the saturated operation. Conversely, when the computation produces a result smaller than the minimum value, the minimum value becomes the result of the saturated operation.

Typically, saturated arithmetic operations are incorporated into the instruction set by adding unique saturated arithmetic instructions. For example, an instruction set may include saturated and unsaturated versions of an integer addition instruction (IADD). Low-level code (e.g., assembly code) may directly use these saturated instructions to perform saturated operations. However, a compiler that compiles high-level code (e.g., Java, C) may be unaware of the saturated instructions in the instruction set. Therefore, a modified compiler may be needed to compile high-level code to object code that utilizes the saturated instructions. The ability to perform saturated arithmetic while avoiding the problems and complications associated with modifying an instruction set is desirable.

BRIEF SUMMARY

In some embodiments a system comprises an overflow control bit, a programmable saturation control bit, a processing unit, and a saturation unit coupled to the processing unit. A selection unit may select the output of the processing unit or the output of the saturation unit based on the state of the saturation control bit. Further, the saturation control unit may output a saturated or unsaturated value based on the overflow control bit.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections. The term "system" is used to refer to a collection of components. For example, a system may comprise a processor and memory and other components. A system also may comprise a collection of components internal to a single processor and, as such, a processor may be referred to as a system.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with the preferred embodiment, saturated instructions are not added to the instruction set of the processor. Instead, a processor can be selectively configured for execution of saturated or non-saturated operations as discussed below.

Figure 1:
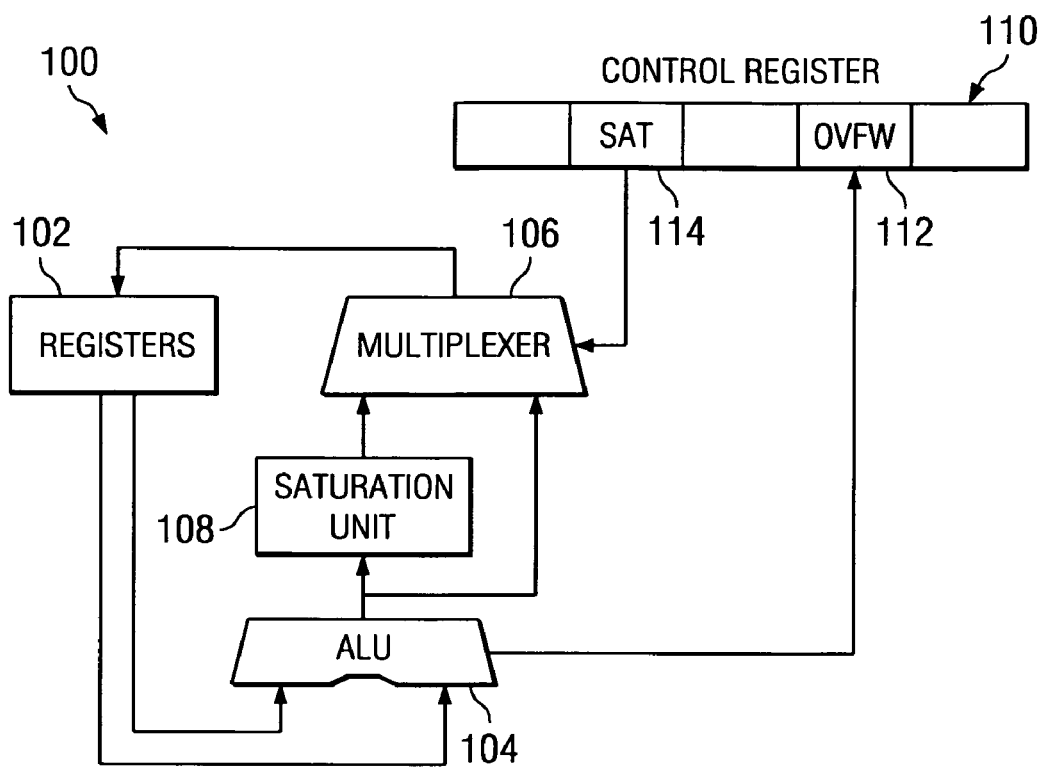
FIG. 1 shows a diagram of a processor in accordance with preferred embodiments of the invention.

FIG. 1 shows an exemplary block diagram of a processor 100. As shown, the processor 100 includes a plurality of registers 102, an arithmetic logic unit ("ALU") 104, a multiplier 106, a saturation unit 108, and a control register 110. Although not explicitly shown, these components preferably reside in the "core" of processor 100. In addition, processor 100 may include other components such as a decode logic, an instruction fetch logic, an address generation unit, and a multiply and accumulate unit. Further, different architectures besides that shown in FIG. 1 are possible.

An operation may begin by retrieving operands from the registers 102 and processing the operands to ALU 104. Alternatively, operands to ALU 104 may be retrieved from external memory and/or a data storage unit (not specifically shown). After processing, the output of ALU 104 is sent to saturation unit 108 and multiplexer 106. The multiplexer 106 preferably selects one of its two inputs to store into registers 102. The first input of the multiplexer 106 is the unsaturated output of the ALU 104 and the second input is the saturated output of the saturation unit 108. The input selected by multiplexer 106 is stored into registers 102 and becomes the result of the operation.

Control register 110 may be one of the registers 102 and comprises a plurality of fields including at least two fields 112 and 114 that are useful to control the operation of saturation unit 108 and multiplexer 106. An "overflow flag" field 112 (OVFW) indicates whether an overflow (or underflow) occurred in the operation performed by the ALU 104. The overflow flag 112 is controlled by the ALU 104 and is preferably set when the ALU 104 detects an overflow in the operation being performed. A "saturation control flag" field 114 enables and disables the saturation functionality described herein. When enabled, the saturation control flag 114 causes arithmetic instructions to produce saturated results. When disabled, the saturation control flag 114 causes arithmetic instructions to produce unsaturated results. The saturation control flag 114 thus can be used to selectively configure the processor 100 for saturated or unsaturated operands, thereby avoiding the need to have saturated and unsaturated versions of various instructions. An application programming interface (API) may be used to set the state (i.e., enabled or disabled) of the saturation control flag 114. The saturation control flag 114 may also be set by the compiler through a specific pragma, or comment line in the high-level code, or directly set in an assembly language macro that is instantiated in the high-level code.

Saturation unit 108 preferably receives the output of ALU 104 and performs a saturation process on this output. The saturation process effectively saturates an input to the highest (or lowest) possible value the data type will allow if the overflow flag 112 indicates that the operation performed by ALU 104 produced an overflow (or underflow). If no overflow/underflow conditions exist, the saturation unit 108 outputs the same value that was received as an input to the saturation unit. Thus, if an overflow/underflow does not occur, saturation unit 108 outputs the value it received from ALU 104.

Since the instruction set of processor 100 may not contain saturated arithmetic instructions, a program developer may call a function within the API to perform saturated operations if desired. Alternatively, saturated operations may be performed after the compiler sets the saturation control flag 114 through a specific pragma, or comment line in the high-level code, or the saturation control flag 114 is directly set in an assembly language macro that is instantiated in the high-level code.

The function that allows saturated arithmetic to be performed may be referred to as a "saturation control function". Based upon the saturation control flag 114, multiplexer 106 may select either the output of saturation unit 108 or the output of ALU 104 to store in registers 102. When a program developer desires to use a saturated arithmetic operation, the saturation control function preferably is executed to enable the saturation control flag 114. After the saturation control flag 114 has been enabled, multiplexer 106 will select the output from saturation unit 108 as the result of the operation to store into registers 102. Similarly, when a developer desires to use an unsaturated arithmetic operation, the saturation control function preferably is executed to disable the saturation control flag 114. Disabling the saturation control flag 114 causes the multiplexer 106 to select the output of ALU 104 to be stored in registers 102. The saturation control flag 114 preferably remains in its programmed state until reprogrammed through the saturation control function, thereby permitting extended sequences of instructions to be executed with or without saturated arithmetic.

Figure 2:
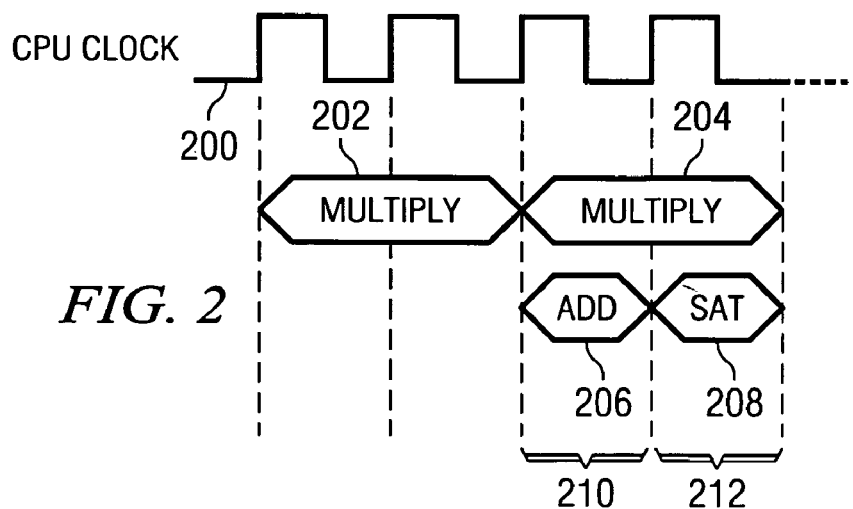
FIG. 2 shows a timing diagram of saturated arithmetic operation in accordance with preferred embodiments of the invention.

FIG. 2 shows an exemplary timing diagram of a saturated addition operation. Four cycles of a CPU clock 200 associated with processor 100 are shown to aid in the discussion. Typically, all unsaturated arithmetic instructions (e.g., addition, subtraction) require one execution cycle. However, a multiply and accumulate (MAC) unit may require two execution cycles to execute a multiply instruction. As shown in FIG. 2, two multiply instructions 202 and 204 may be executed consecutively in a MAC unit. In parallel with the second multiply instruction 204, a saturated addition may be performed. As explained below, FIG. 2 illustrates that, in some situations, saturated operations may not introduce extra latency.

In accordance with the preferred embodiment, while saturation control bit 114 is enabled, all arithmetic instructions require one additional execution cycle. During the first cycle 210, ALU 104 preferably performs the unsaturated ADD instruction 206 contained within the instruction set of processor 100. If an overflow/underflow occurs while performing this instruction, the overflow flag 112 accordingly may be updated by the ALU 104 during this first cycle 210. During the second cycle 212, the saturation process 208 (SAT) preferably occurs via the operation of the saturation unit 18, which accepts an unsaturated input from ALU 104 and produces a saturated output. If the overflow flag 112 indicates that an overflow/underflow occurred in ALU 104 during cycle 210, the saturation process saturates the input. If the overflow flag 112 indicates that an overflow/underflow did not occur in ALU 104, the output from the saturation unit 108 is made identical to the input (not saturated).

To perform unsaturated arithmetic operations, saturation control bit 114 is disabled by action of the saturation control function. While the processor 100 is in unsaturated mode, the multiplexer 106 selects the unsaturated output of ALU 104 as the result of operations and ignores the output of the saturation unit 108.

Although ALU 104 is used in the preferred embodiment, any suitable type of processing unit (e.g., a multiplier and accumulate unit) similarly may be used as input to the saturation unit 108, thereby allowing other saturated operations to occur, such as left shifts.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor, comprising:
   a programmable saturation control bit;
   a processing unit that produces an unsaturated output;

a saturation unit coupled to the processing unit and that produces an output that is saturated upon the occurrence of an underflow or overflow condition; and a selection unit that receives the outputs from the processing and saturation units and selects one of the two outputs as an output from the selection unit based on the state of the saturation control bit.

2. The processor of claim 1 wherein the processing unit comprises an arithmetic logic unit.

3. The processor of claim 1 wherein the processing unit comprises a multiply and accumulate unit.

4. The processor of claim 1 wherein the selection unit comprises a multiplexer.

5. The processor of claim 1 wherein the saturation unit forces the saturated output to be a maximum value if an overflow occurs in the processing unit.

6. The processor of claim 1 wherein the saturation unit forces the saturated output to be a minimum value if an underflow occurs in the processing unit.

7. The processor of claim 1 wherein the saturation control bit is programmed through an application programming interface.

8. The processor of claim 1 wherein the saturation control bit is programmed through an assembly language macro that is instantiated in high-level code.

9. The processor of claim 1 wherein the saturation control bit is programmed through a compiler through a specific pragma.

10. The processor of claim 1 wherein the saturation control remains set for multiple instructions.

11. A method for performing saturated arithmetic in an electronic apparatus, comprising:

receiving an unsaturated output from a processing unit in said electronic apparatus;

processing the unsaturated output to produce a saturated output upon occurrence of an overflow or underflow condition; and selecting between the saturated output and unsaturated output based on the state of a programmable saturation control bit.

12. The method of claim 11 wherein the saturation control bit is programmed through an application programming interface to cause either saturated or non-saturated operations to be performed.

13. The method of claim 11 wherein processing the unsaturated output comprises forcing the saturated output to be a maximum value if an overflow occurs in the processing unit.

14. The method of claim 11 wherein processing the unsaturated output comprises forcing the saturated output to be a minimum value if an underflow occurs in the processing unit.

15. A processor, comprising:

a means for performing an unsaturated operation to produce an unsaturated value;

a means for saturating the unsaturated value to produce a saturated value; and a means for dynamically selecting between the unsaturated value and the saturated value based upon a mode bit that indicates whether saturated or unsaturated operations are to be performed.

16. The processor of claim 15 further comprising a means for setting the mode bit.

17. The processor of claim 15 wherein the mode bit remains set for the execution of multiple instructions.

* * * * *